United States Patent [19]

Sasaki

[11] Patent Number: 4,644,531
[45] Date of Patent: Feb. 17, 1987

[54] TIME DIVISION COMMUNICATION SYSTEM

[75] Inventor: Susumu Sasaki, Fujisawa, Japan
[73] Assignee: Fujitsu Limited, Kawasaki, Japan
[21] Appl. No.: 448,906
[22] PCT Filed: Apr. 1, 1982
[86] PCT No.: PCT/JP82/00094
  § 371 Date: Dec. 3, 1982
  § 102(e) Date: Dec. 3, 1982
[87] PCT Pub. No.: WO82/03515
  PCT Pub. Date: Oct. 14, 1982

[30] Foreign Application Priority Data

Apr. 7, 1981 [JP] Japan .................... 56-52167
Jun. 22, 1981 [JP] Japan .................... 56-96313
Sep. 22, 1981 [JP] Japan .................... 56-14962
Nov. 16, 1981 [JP] Japan .................... 56-183367
Dec. 17, 1981 [JP] Japan .................... 56-204030
Dec. 28, 1981 [JP] Japan .................... 56-211151

[51] Int. Cl.[4] .................... H04J 3/00; H04J 3/06
[52] U.S. Cl. .................... 370/77; 370/104
[58] Field of Search .................... 370/77, 48, 95, 100, 370/104

[56] References Cited

U.S. PATENT DOCUMENTS 3,887,873 6/1975 Duncan et al. .................... 370/77
4,455,651 6/1984 Baran .................... 370/104
4,483,000 11/1984 Yamamoto et al. .................... 370/95

OTHER PUBLICATIONS

Wissenschaftlichen Berichte Aeg-Telefunken, vol. 51, No. 4/5, Apr./May 1978, Berlin, S. Borner, "Modems fur Digitalubertragung im Burstbetrieb uber Nachrichtensatelliten", pp. 212–224.
Electronics and Communications in Japan, vol. 55 B, No. 6, Jun. 1972, Washington, T. Okamoto et al, "Design and Performance of the Carrier-Pulse Transmission System with the Approximate Zero-Crossing Waveform", pp. 47–55.
European Search Report, Examiner J. P. Verslype, 18-6-84, The Hague.

*Primary Examiner*—Douglas W. Olms
*Assistant Examiner*—Wellington Chin
*Attorney, Agent, or Firm*—Staas & Halsey

[57] ABSTRACT

A time division communication system where particular codes are added to modulation input data corresponding to front and rear edges of a data burst so that the modulated wave in the front and rear edges of the data burst from the station becomes a 100 percent amplitude modulated wave. By making use of the characteristic that the amplitude element is superimposed on the modulated wave signal during phase modulation and amplitude modulation, switching is performed at the point where the amplitude of the modulated wave becomes zero and the switched signal is inserted in a time slot assigned thereto.

21 Claims, 18 Drawing Figures

Fig. I(a) 
Fig. I(b) 
Fig. I(c) 
Fig. I(d) 
Fig. I(e) 
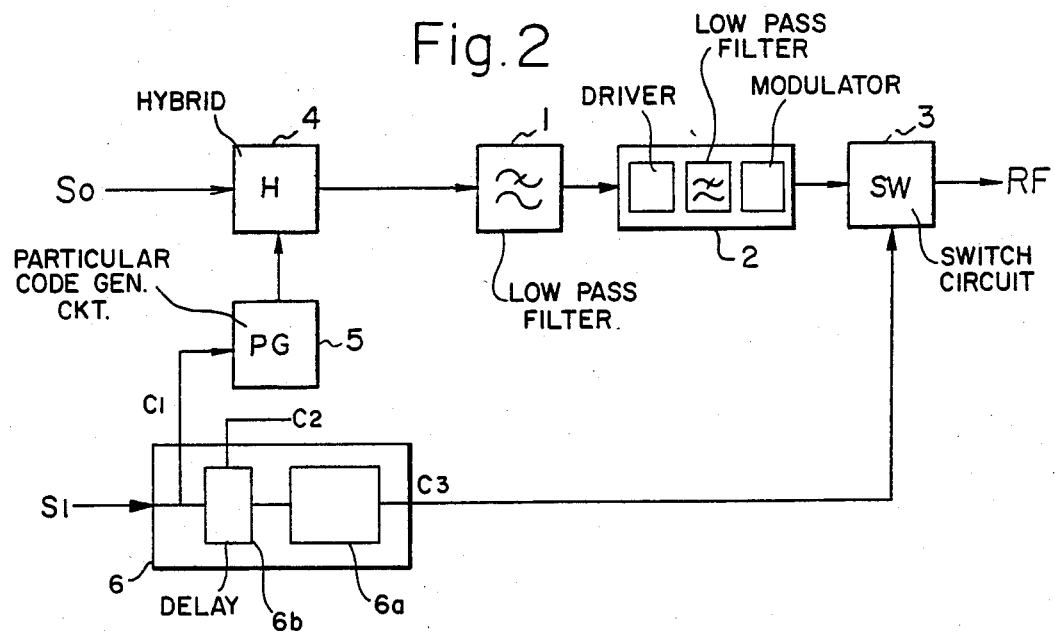

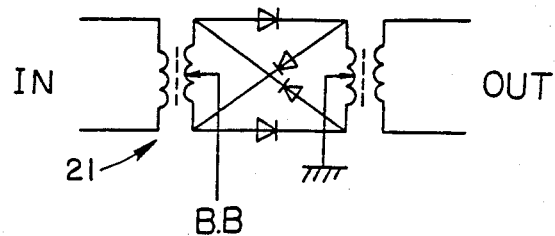
Fig.11
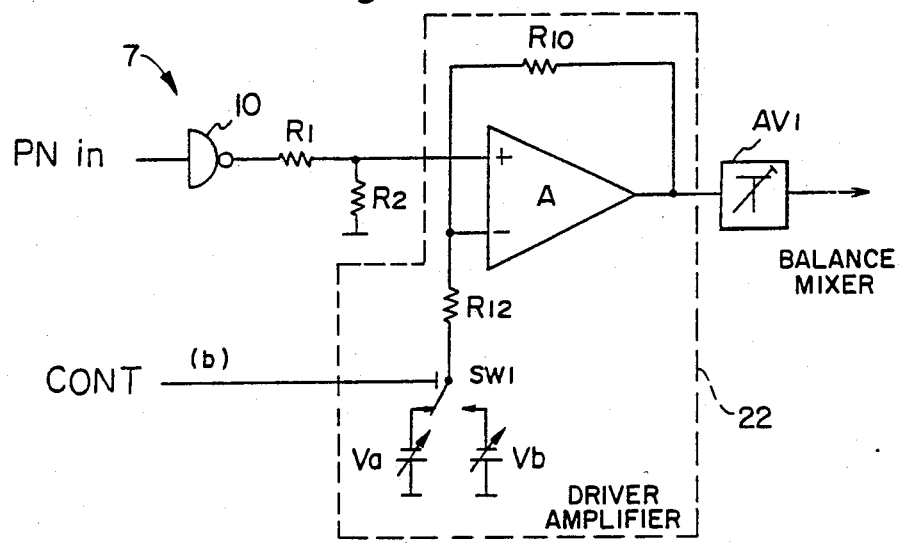
Fig.12
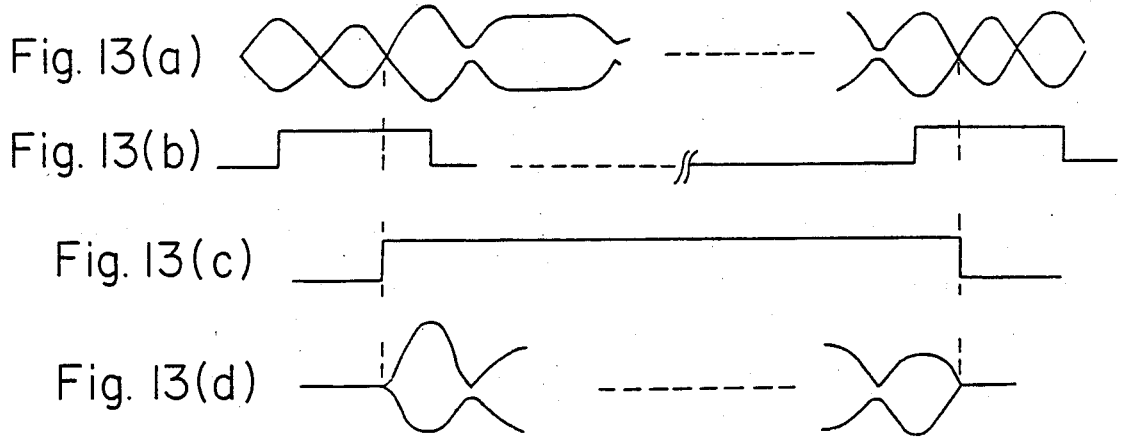
Fig. 13(a)
Fig. 13(b)
Fig. 13(c)
Fig. 13(d)

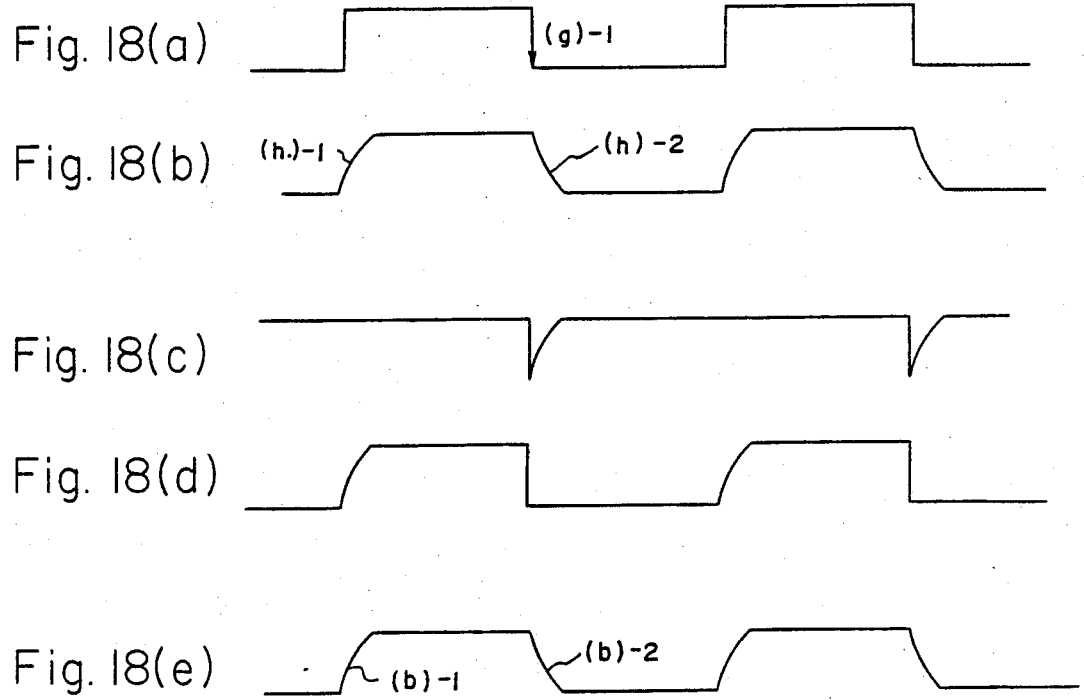

TIME DIVISION COMMUNICATION SYSTEM

BACKGROUND OF THE INVENTION

This invention relates to a time division communication system, and more particularly to a burst signal generating system where generation of an undesired signal is suppressed, when the burst signal is generated, by switching a modulated wave under a band limitation in a baseband.

In a time division communication system, a modulated signal, such as a phase modulated or amplitude modulated signal, is transmitted in the form of a burst signal because such a signal is transmitted in an assigned time slot. Therefore, in such a time division communication system, a switch is usually provided after a modulator and a burst signal is generated by switching the modulated wave using the ON/OFF control of a rectangular signal. Such a burst signal is then inserted into the assigned time slot.

However, when such switching is carried out for the modulated wave by a switch, an undesired signal is generated because of an impulse response caused by the front and rear edges of the burst signal. The undesired signal is generated on the basis of the impulse of response of the system. Consequently, a spectrum generated by the impulse is wide, influencing other communication channels in the system. For example, a plurality of time dividing channels operating at different frequencies co-exist in a time dividing system, and in such a case, a widely spreading spectrum may adversely influence the other time dividing channels.

The impulse spectrum distribution can easily be limited by using a filter and the undesired signal can be eliminated by connecting a bandpass-filter with a narrow frequency pass band to the succeeding stage of the switch circuit.

However, this method is, of course, not capable of eliminating the undesired signal component within the pass band of the bandpass-filter and, moreover, it is difficult, as is well known, to construct a filter which provides a very narrow band limitation in an RF (radio frequency) signal.

Thus, it is necessary, in one method used, for proper band limitation, to perform such band limitation in an intermediate frequency and then convert the intermediate frequency up to the radio frequency. But this method also has a problem. Namely, when a bit rate is high as compared to the RF carrier frequency, an undesired signal can be eliminated easily because the main lobe is in the vicinity of the RF carrier frequency. Therefore, it is necessary to execute a band limitation in the baseband frequency and then convert the frequency up to the radio frequency by a heterodyne method.

Moreover, an undesired signal resulting from the switching operation can easily be eliminated by such a simple method in which the rectangular wave signal for controlling the ON/OFF of the burst signal is smoothed. However, it is difficult for this method to shape the waveform at the rising and falling portions because a diode is usually employed as the switching element and, in some cases, data is lost, level dropping occurs, and burst interference occurs at the extremely gentle rising and falling portions of the waveform.

SUMMARY OF THE INVENTION

It is an object of the present invention to provide a system which can efficiently eliminate an undesired signal by making use of the amplitude characteristics of a modulated signal.

Moreover, it is another object of the present invention to provide a system which easily shapes an ON/-OFF signal waveform for a switching operation and then eliminates the undesired signal produced based on the switching.

According to the present invention, generation of a momentary undesired signal based on the switching can be prevented by adding particular codes before and after the burst signal and making use of the fact that the transmitted signal, such as a phase-modulated or amplitude-modulated signal, is always accompanied by 100% amplitude modulation.

Even when this invention is applied to the multiphase modulation system having 4-phases or more by changing the offset voltage of a modulator driving circuit only before and after the burst signal, the switching is carried out at the point where the amplitude of the modulated wave becomes zero.

In the present invention, another method of executing the switching at the point where the amplitude of the modulated wave is zero adjusts an input signal for the modulator driving circuit to a constant voltage before and after the burst signal, and the offset voltage of the driving circuit is changed therein.

In addition, the present invention uses a signal, which is obtained via an amplifier or buffer having a low output impedance and after the rising and falling edges of the ON/OFF signal are shaped by a filter circuit, as the switching signal for controlling the burst signal, in order to prevent generation of the unwanted waveform at the time of the switching operation.

Moreover, the present invention also uses, as the switching signal, a signal obtained by combining the signals resulting from shaping the rectangular ON/OFF signal using an integral circuit and the signal obtained by differentiating the falling edge of the ON/OFF signal.

BRIEF DESCRIPTION OF THE DRAWINGS

FIG. 1 illustrates the waveforms used for explaining the switching operation for time division transmission systems;

FIG. 2 is a block diagram of a radio system to which the present invention is applied;

FIG. 11 is a phase shift circuit of the present invention;

FIG. 12 is a modulator driving circuit of the present invention;

FIG. 13 explains the control timing of a driver circuit in relation to the present invention and the burst signal waveform;

FIG. 18 illustrates the waveforms at portions of the circuit shown in FIG. 17.

DESCRIPTION OF THE PREFERRED EMBODIMENTS

Figure 3A:
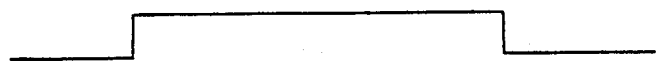
FIG. 3 explains the particular code inserting procedures and timing of the switching operation in relation to the present invention.

An embodiment of the present invention is explained hereunder with reference to the attached drawings. FIG. 1, including FIGS. 1(a)-1(c), shows the waveforms for explaining the switching operation during time division transmission. FIG. 1(a) shows the waveform (envelope) of a signal that has been subjected to 2-phase modulation by band-limited modulation input data, as an example of a modulated wave having an amplitude element. Although omitted in the figure, each envelope waveform includes an RF signal having phases of 0, $\pi$. When the ON/OFF signal has a phase, as shown in FIG. 1(b), at the time of controlling a switch with the ON/OFF signal by inputting the modulated wave thereto, an output shown in FIG. 1(c) can be obtained after the switching operation. In this case, the rising portion is sharp and an impulse response by the transmission system is generated. On the other hand, if the ON/OFF signal has a phase as shown in FIG. 1(d), there is almost no carrier at this time, and the amplitude element is zero and, therefore, an output shown in FIG. 1(e) can be obtained after the switching operation and thereby generation of the impulse response by the system can be prevented.

However, when the modulator output is a continuous wave, it does not always become the waveform as shown in FIG. 1(e) at the front and rear edges of the burst signal of the sending station.

In the present invention, particular codes (bits) are added to the input data to be modulated, then the modulated wave signal is switched, and the 100 percent amplitude modulation is forcibly carried out. Thereby, the waveform as shown in FIG. 1(e) can always be obtained when controlling the ON and OFF of the switch using the ON/OFF signal, generation of the impulse response can be avoided and generation of the undesired signal can be eliminated.

FIG. 2 shows the block diagram of the main circuit for generating the burst waveform of radio system to which the present invention is applied. In this figure, 4 is a hybrid circuit (combiner); 1 is a low-pass-filter unit (LPF); 2 is a modulator unit; 3 is a switch unit; 5 is a particular code generator unit; and 6 is an ON/OFF signal controller unit.

The data S0 to be transmitted is temporarily stored in a memory, etc. (not shown) and it is to be sent by the burst of the station. At the time of the transmission, the particular codes generated by the particular code generator 5 are placed in preceding and succeeding portions of this data in synchronization with the switch ON/OFF signal. In addition, although omitted in FIG. 2, a pseudo signal is also added in the time slot other than the assigned time slot and, thereby, the continuous base band signal (modulated input data signal) can be obtained.

Thereafter, as in the case of the existing time division signal transmission, band limitation is carried out by the LPF 1 and the carrier (IN CARRIER) is phase-modulated by the modulator 2. Then, switching is carried out by the switch 3 at a position corresponding to that, for example, between the particular bits, consisting of 1 and 0, inserted in the front and rear of the data stream, and, thereby, the signal is transmitted in such a manner that the modulated wave is located within the proper time slot and bandwidth.

Figure 3B:
Figure 3C:
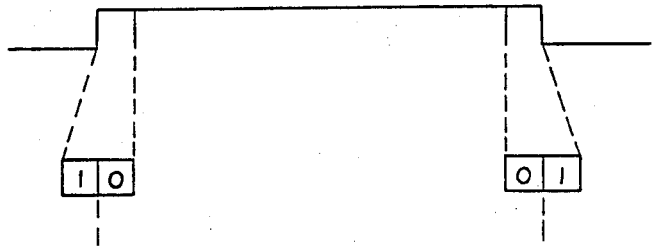

FIG. 3, including FIGS. 3(a)-3(e), shows the waveforms for explaining addition of the 1, 0 (or 0, 1) bits and the switching in the 2-phases modulation. The waveform FIG. 3(a) shows the data to be transmitted and this signal is sometimes partitioned by the PN signal at its front and back sides. The waveform FIG. 3(b) shows the 1, 0 (or 0, 1) bits to be added. As shown in the waveform FIG. 3(c), the bits to be added are inserted in the front and back sides of the data. For example, as shown in the waveform FIG. 3(d), two bits of 1 and 0 are inserted in the front side of the data, while two bits of 0, 1 are inserted in the back side.

Figure 3D:
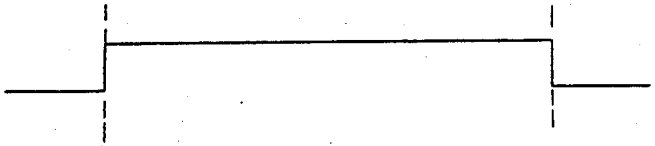
Figure 3E:

The switching is carried out, as shown in FIG. 3(d), in the modulated wave area corresponding to the particular codes of 1, 0 or 0, 1. Therefore, a modulated output as shown in FIG. 3(e) can be obtained with the added particular codes occupying bit by bit, respectively, the front and back sides of a burst in such modulated wave output. These guard bits are provided in the front and back side of the data in order to prevent interference resulting from the switching. Namely, the added bit corresponds to this guard bit and it does not mean that the number of information carrying bits of the send data has increased.

Explained above is the system where modulation is carried out under the condition that the absolute value of the data corresponds to the phase of the modulated wave, that is, the present invention is applied to a system which has differential phase modulation. In this case, data is included or encoded in the change of phase. A 2-phase phase modulation is explained hereunder. For example, the state where there is no input signal is considered as "0", and with this "0" considered as the initial value, a change of phase of occurs in the modulated wave to be transmitted when the input signal is "1", while a change of 0 occurs when the input signal is "0". Therefore, as explained above, a change of 100 percent in amplitude can be obtained in the modulated wave only by having "1" as the first bit of the burst signal and the first bit following the burst signal produced by the input data of the modulator. The system of the present invention can be applied not only to the 2-phase phase modulation scheme, but also 4-phase, 8-phase phase or more phases phase modulation schemes, including a modulation system having amplitude characteristic elements such as amplitude modulation (AM) and QAM (Quadrature Amplitude Modulation), etc.

As explained above, according to the present invention, generation of the undesired signal due to the switching can be prevented by only adding a small number of bits to the data to be transmitted.

Figure 4A:
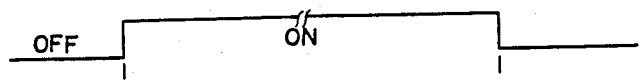
FIGS. 4 and 5 illustrate the waveforms in the time and frequency domains, respectively, when 100 percent amplitude modulation occurs at a point separated by a period of one symbol from the front and rear edges of the burst signal and the undesired signal.
Figure 4B:
Figure 4C:
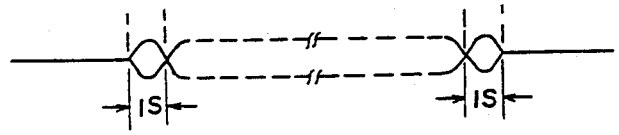

FIG. 4, including FIGS. 4(a)-4(c), and FIG. 5 explain the waveform and the undesired wave in a case where the added code is reversed in the input data signal for each symbol (S) at the front and rear edges of the burst signal. In FIG. 4, FIG. 4(a) shows the ON/OFF signal for switching and FIG. 4(b) shows the input data signal. FIG. 4(c) shows the modulated wave envelope in a case where phase modulation or amplitude modulation is carried out by applying such a data signal to the circuit shown in FIG. 2. Namely, as shown in 4(c), since the switching is carried out when the signal is subjected to the phase inversion or 100 percent amplitude modulation, the envelope at the front and the rear edges of burst signal becomes smooth and an undesired signal is not generated.

However, in actual practice, it is difficult to perfectly eliminate the undesired signal generated by the ON/OFF operation because of imperfectness of the switch itself.

Figure 5:
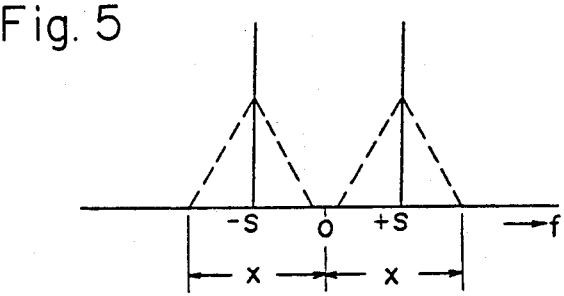

FIG. 5 shows generation of the undesired signal based on the impulse response when the modulated wave is switched by the switch and it is obvious from this figure that the spectrum spreads widely from the center which is indicated by 0 on the frequency axis and is isolated by S in terms of symbol rate, respectively, in the upper and lower direction from the carrier position. In FIG. 5, particularly as shown in FIG. 4(c), the spectrum waveform when 100 percent amplitude modulation of one symbol is applied to the front and rear edges of the burst signal is shown. Here, as explained above, the spectrum waveform appears at the point isolated by $\pm S$ (symbol) from the center frequency and, simultaneously, the spectrum waveform produced by the undesired signal generated by the switching (ON/OFF) operation spreads around $\pm S$.

The spectrum of the undesired signal spreading in the area indicated by $\pm x$ about the position 0 of the carrier indicated in FIG. 5 extends outside the allowable bandwidth, thereby sometimes causing interference on other communication lines or channels.

Figure 6A:
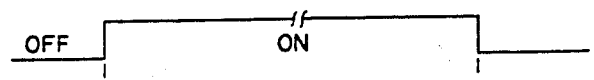
FIGS. 6 and 7 illustrate the waveforms when 100 percent amplitude variation occurs at a point separated by the period of two symbols from the front and rear edges of the burst signal and the undesired signal.
Figure 6B:
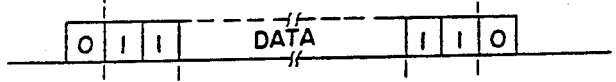
Figure 6C:
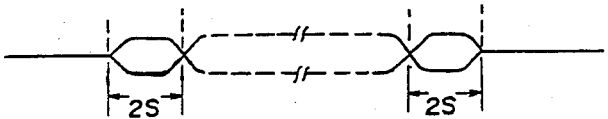
Figure 7:
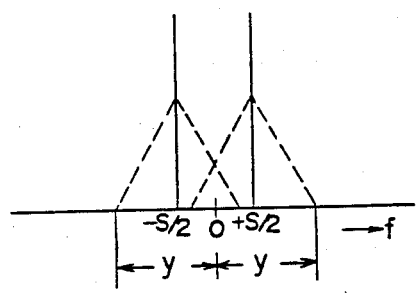

On the other hand, it is also possible that the 100 percent amplitude modulation can be carried out at the point isolated by the time 2S or more from the front or rear edge of the burst signal FIG. 6, including FIGS. 6(a)–6(c), and FIG. 7 explain the signal waveform and undesired signal in this case. In FIG. 6, FIG. 6(a) shows the ON/OFF signal for switching, while FIG. 6(b) shows the input data signal. Moreover, FIG. 6(c) shows the envelope of the modulated wave when phase modulation or amplitude modulation is carried out by applying the data signal shown in FIG. 6(b) to the circuit of FIG. 2. As shown in FIG. 6(b), the 100 percent amplitude modulation can be realized at the point isolated by the period 2S from the rising or falling edges of the burst signal, as shown in FIG. 6(c), by causing the data signal, for which the first two symbols in a different polarity continue following the first one symbol, to trigger the phase inversion or 100 percent amplitude modulation in synchronization with the rising or falling edge of a rectangular wave signal. FIG. 7 shows the spectrum of the 100 percent amplitude modulated wave and the spectrum of the unwanted wave generated based on the impulse response caused by the switch output. As is obvious from this figure, the spectrum of the modulated signal and that of the undesired signal spread on both sides of the point isolated by S/2, respectively, in terms of symbol rate along the upper and lower wides of the frequency axis located on both upper and lower sides of the carrier position indicated by 0. In this case (FIG. 7), the signal level of the undesired signal is equal to that of the signal shown in FIG. 5, but the spectrum of the undesired signal is $\pm y$ with the carrier existing at the center which is drastically reduced as compared with that of FIG. 5 and, therefore, the adverse effect caused by this method (FIG. 7) on the other communication channels is also reduced extensively.

In the case of the embodiment shown in FIG. 6 and FIG. 7, a continuous signal of at least two symbols is placed on the front and rear sides of the burst signal and a bit rate at the time of ON/OFF is substantially reduced, to make the spread of the spectrum narrow. Such an embodiment has the same structure as that shown in FIG. 2 and is realized by setting a bit length formed by the particular code generator 5 to a value which assures continuation of the same state for at least two symbols in the front and rear sides of the burst signal.

Figure 8:
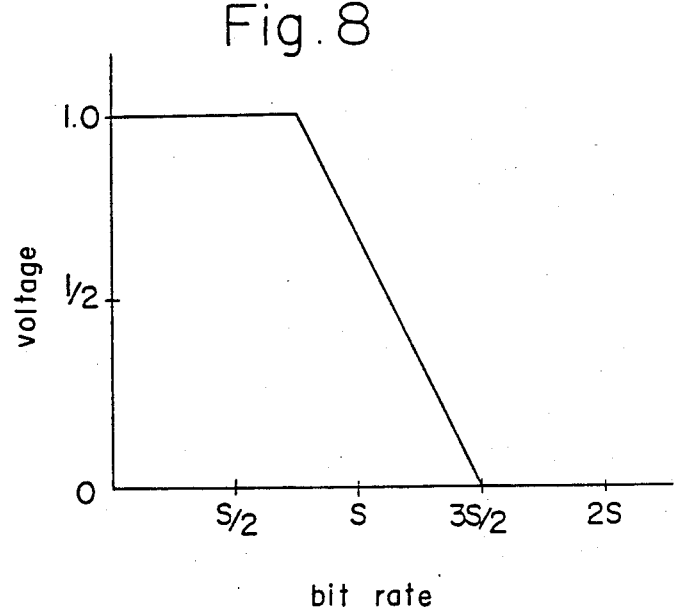
FIG. 8 illustrates the frequency vs. voltage characteristic of a low-pass-filter circuit for band limitation.

Particularly, in this case, using a roll-off filter, which performs a roll-off of 50 percent, as a low-pass-filter for band limitation and which has the bit rate and voltage characteristic as shown in FIG. 8 is very effective because it has the characteristic that the spectrum becomes zero at the point where the bit rate becomes $\pm 3/2S$.

In this case, the spread of the spectrum is limited because the same state continues longer in the burst signal; however, such same code or level condition is obtained by forcibly adding the particular codes to the burst signal and it is undesirable to set the code condition length much longer because the amount of information data that can be transitted is greatly reduced thereby.

For this reason, it is considered most effective for the practical realization of the present invention to set the bit length of particular codes added at a length which assures continuation of the same code for two symbols at the front and rear edges of the burst signal, because spread of the spectrum using this method is just absorbed by a 50 percent roll-off filter which is generally available.

Namely, the spectrum of the burst signal wherein the same code of two symbols continues in the front and rear sides centered around the frequency point of $\pm(S/2)$, and as shown in FIG. 7, the spectrum of the undesired signal spreads in the periphery of spectrum around the point $\pm(S/2)$, with the odd harmonics of the spectrum being generated by the distortion of the amplifier. Among these harmonics, the harmonic wave of a third order is nearest to the center frequency and causes the most serious problem. Namely, harmonics are generated at a signal level lower than the signal level of the initial spectrum at the frequency of $\pm(S/2)\times 3$ and the harmonics become the undesired signal outside the passband, as explained before.

Therefore, it is essential to prevent such harmonics of the third order as much as is possible. When the 50 percent roll-off filter is used, the level or the value of the spectrum at the point of $\pm(3/2)S$ can be set to zero by causing the same codes of two or more symbols to continue at the front and rear edges of the burst signal. Thus, it is very effective in preventing generation of the undesired signal.

Although a comparatively simple modulation system, such as the above-mentioned 2-phase modulation, does not bring about a problem, it is difficult for the 4-phase, 8-phase, to n-phase ($n=2^m$, m—0, 1, 2, ...) modulator to realize a perfect 100 percent amplitude modulation only using the baseband system due to things, such as mismatching of the structural components themselves, and, therefore, some carrier leakage or channel crosstalk generally occurs.

Figure 9:
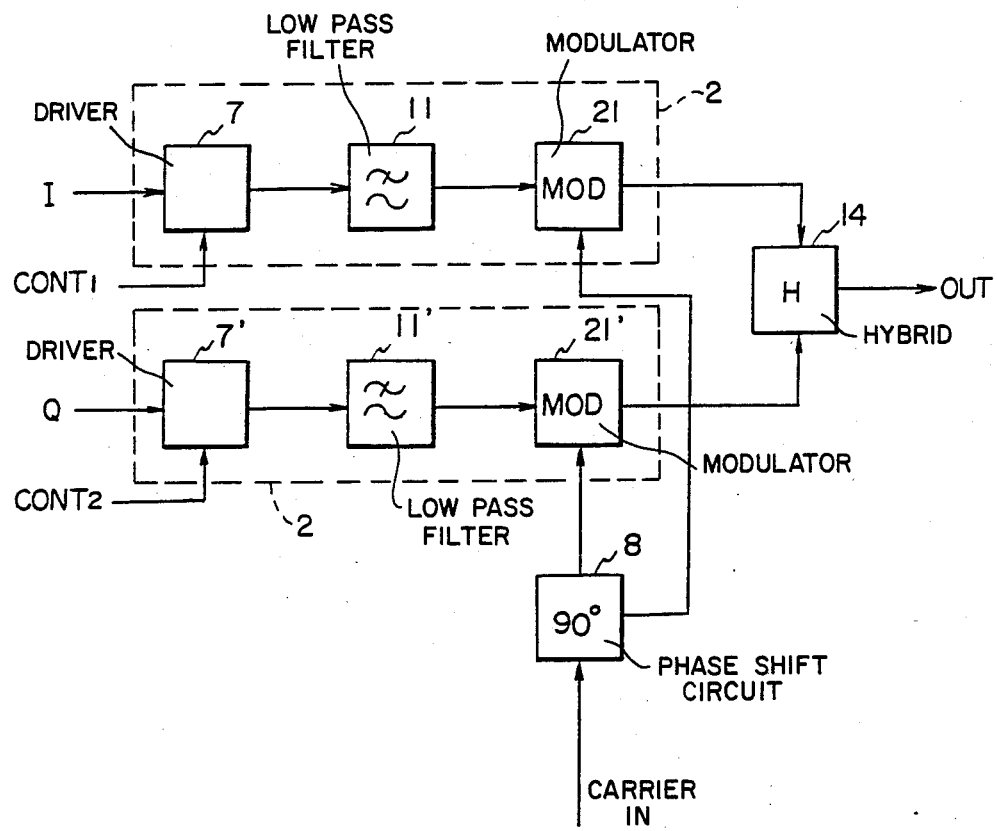
FIG. 9 is the block diagram of a main circuit of a 4-phases phase modulation circuit.
Figure 10A:
FIG. 10 illustrates the waveforms when switching is carried out for the 4-phases phase modulated wave.

For example, when using 4-phase phase modulation, if the modulators 21, 21' of the modulation unit 2 and hybrid 14 in FIG. 9 are ideal elements, the PN signal I and Q (input data corresponding to the input to modulator unit 2 in FIG. 2) have the same amplitude and the same offset voltage of zero through the driver circuits 7, 7' and a perfect 4-phase modulated wave as shown in FIG. 10(a) can be obtained.

The perfect $\pi/0$, $0/\pi$ modulations are carried out and, therefore, the modulated wave output is switched at zero, as shown in FIG. 10(a), not allowing generation of the undesired signal.

However, practically, the balance mixer used in the modulators 21, 21' is structured as shown in FIG. 11 and is used as the $0/\pi$ modulator. In addition, in the normal state, the modulated wave amplitude and offset voltage are shifted because the hybrid 14 and other circuits are imperfect and the carrier is delayed, and, thereby, the equivalent 4-phase modulation can be realized with the 4-phase modulator output.

Figure 10B:
Figure 10C:
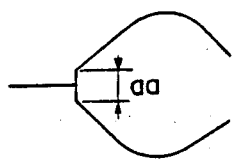
Figure 10D:

For this reason, an output often does not become the 100 percent amplitude modulated wave, as shown in FIG. 10(b), and continues to generate carrier leakage. If the modulated wave is controlled for ON and OFF at the timing shown in FIG. 10(d), the impulse response occurs only at the portion aa of FIG. 10(c). Therefore, it is difficult to perfectly suppress the generation of the undesired signal.

Particularly in such a case, in the present invention, particular codes are added to the front and rear sides of the send data and the offset voltage of the driver for the modulator of switching realizes a perfect zero crossing.

In more concrete terms, a perfect zero crossing can be realized by changing the offset voltages of driver circuits 7, 7', respectively, for a constant period by using the control signals CONT1, CONT2 (corresponding to C2 in FIG. 2) in a specified timing relationship with the burst ON/OFF signal in the 4-phase modulation circuit.

FIG. 12 shows the structure of such a driver circuit 7. In this figure, 10 is the gate circuit and AV1 is the balance mixer.

Here, an offset voltage is at first generated from Va in the normal condition and the amplitude of the baseband signal is adjusted using the balance mixer AV1 and, thereby, the imperfections of each element are compensated and the modulated signal can be obtained.

Thereafter, when executing the switching at the timing shown in FIG. 13(c), the switch SW1 is changed over to the offset voltage Vb which is set, for example, so that the modulated wave of $\pi/0$ or $0/\pi$ always has zero-crossing at the time near the switching time shown in FIG. 13(b).

As shown in FIG. 13(d), the burst signal generated herein shows an inbalance in the amplitude component at its front and rear edges. But such bits naturally correspond to the particular codes added to realize the zero-crossing of modulated waves at the time of switching and, therefore, such bits are naturally not required to be sent as accurately as the data.

In the embodiment explained above, the modulated signals are forced to have zero-crossing at the time of switching and the offset voltage of the driver circuit for the modulator is also controlled. Considering such characteristics, it is particularly effective to apply this invention in a modulation system, for example, in which it is difficult to obtain a perfect zero-crossing of amplitude, such as the multi-phase modulation system of 4-phases or more.

Explained above is a method of preventing generation of an undesired signal at the time of switching by inserting particular codes into the positions corresponding to the front and rear edges of a burst signal and forcing 100 percent amplitude modulation. Another method will now be considered which realizes switching at the point where the amplitude component is zero by interrupting an input signal to the driver circuit for the modulator or keeping it at a constant voltage. Such a method is explained below, with reference to the drawings.

Figure 14:
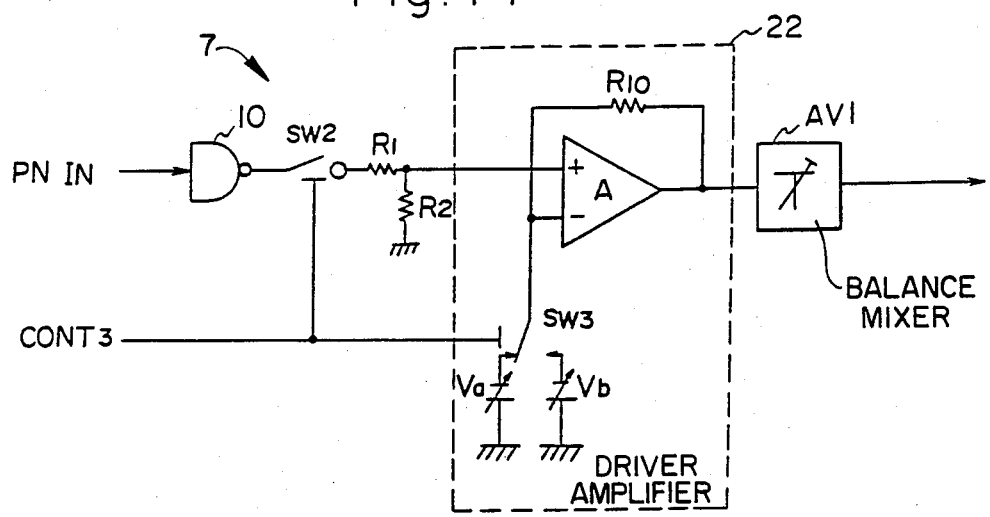
FIG. 14 is a circuit in which the supply of the input signal of the driver circuit is interrupted and in which the offset voltage is controlled.

FIG. 14 shows the structure of a driver circuit similar to that of FIG. 12. In this figure, the portions given the same numberings as those of FIG. 12 indicate the same portions.

In FIG. 14, the switch SW2 is turned ON by the control signal CONT 3 (corresponding to C2 in FIG. 2) during the burst data transmission, while the switch SW3 is connected to the side of the offset voltage Va. The amplitude, etc. of the input signal (baseband signal) is adjusted, so that the above-mentioned 4-phase modulator output becomes the ideal modulated wave by adjusting the offset voltage Va and thereby the imperfections of each element are compensated.

At the time of switching, the switch SW2 is set to OFF, while the switch SW3 is set to the side of offset voltage Vb. When each element is ideal, the modulated wave output becomes 0 if the offset voltage is set to 0 while an input signal is 0. However, since carrier leakage occurs due to the imperfectness of the elements, it is necessary to set the modulated wave output to 0 by cancelling the carrier leakage through the adjustment of the offset voltage Vb.

Thereby, switching at the amplitude zero point becomes possible, moreover without generation of the undesired signal.

In FIG. 14, the control signal CONT3 for controlling the switching of the switches SW2, SW3 is generated in synchronization with the burst ON/OFF signal.

Figure 15:
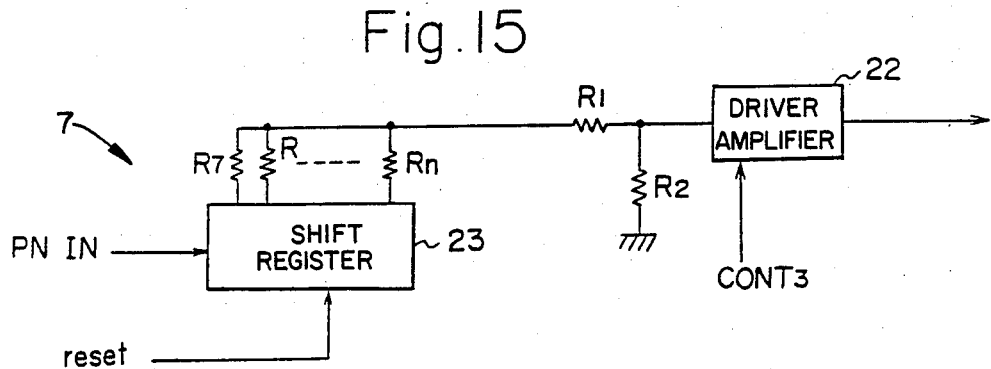
FIG. 15 illustrates a digital filter used in a stage preceding a driver amplifier circuit.

FIG. 15 shows an embodiment of a digital filter comprising a shift register 23 in a stage preceding the stage of the driver circuit amplifier 22 and shift register 23 is reset with the reset signal at the time of switching and keeps its output voltage at a constant value. In FIG. 15, the shift register 23 substitutes for the gate 10 and switch SW2 of FIG. 14, and the reset signal corresponds, but is not identical to the CONT3 signal of FIG. 14. The same effect, as a result of controlling the switch SW2 of FIG. 14, can be obtained by adjusting the offset voltage Va and Vb of the driver circuit as explained above with reference to such a constant voltage.

Also in the embodiment of FIG. 15, switching of the offset voltage Va, Vb of the driver circuit 22 is carried out by the control signal CONT3 being synchronized with the ON/OFF signal for switching.

Figure 16:
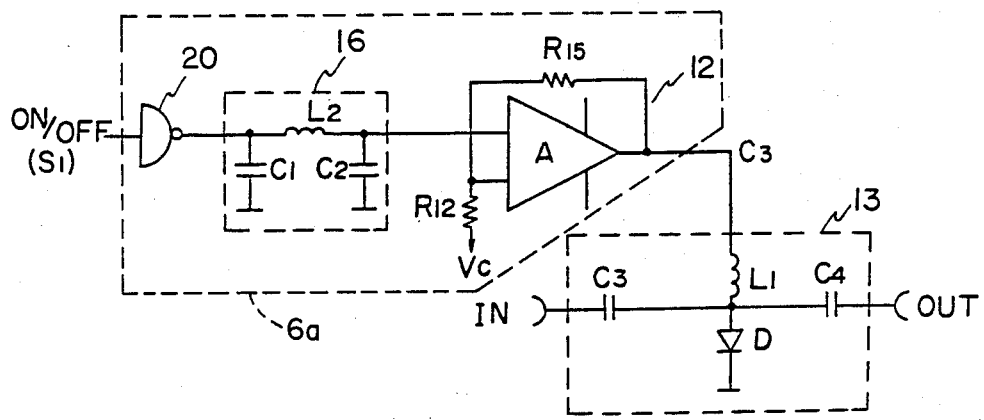
FIGS. 16 and 17 illustrate a control circuit and a switching circuit for generating the burst signal.

The control of the burst ON/OFF signal in relation to the switching of the modulated wave is explained hereunder. FIG. 16 shows an example of the switch circuit 3 and control circuit 6 applied in the present invention. In this figure, 20 is a gate circuit for supplying the ON/OFF signal, 11 is a filter, for which, for example, a low-pass-filter comprising coil L2, capacitors C1, C2 shown in the figure are used. 12 is a DC amplifier, which is structured, for example, using an operational amplifier A wherein a DC feedback signal is transmitted through a resistor R15 as shown in the figure and a constant DC input is applied through the resistor R12, and realizes a very low output impedance, and, simultaneously, outputs a positive voltage +V and a negative voltage −V, corresponding to outputs "1" and "0" of the filter 16.

13 is a switch circuit corresponding to the switch circuit 3 of FIG. 2. The PIN diode D is turned ON and OFF by controlling a current via the choke coil L1 with an output of the DC amplifier 12, thereby the input modulation signal IN output from the capacitors C3 and C4 is switched, thus outputting a burst signal output OUT. As a filter used for waveform shaping, not only is the filter shown in FIG. 16 used, but also those filters which have a specified time constant which results in a transient response which assures smooth rising and falling edges at the front and rear edges of the output signal waveform can be used.

As explained above, the switch circuit in FIG. 16 is very effective for reduction of the undesired signal when the burst signal is generated, because it is not influenced by accummulated charges on the switching diode D since an amplifier having a low output impedance is used and the burst signal output having a waveform conforming to the time constant of the filter 16 added for waveform shaping can be obtained.

Figure 17:
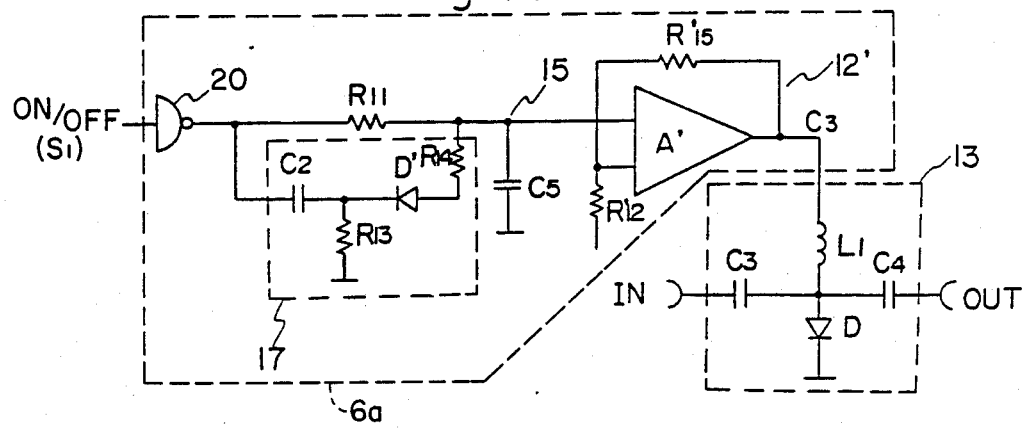

FIG. 17 shows another embodiment of the switch circuit 3 and control circuit 6 applied to the present invention. In this figure, the gate circuit 20 and switch circuit 13 have the same structure as the circuits shown in FIG. 16. In addition, the resistor R11 and capacitor C5 form an integral circuit which shapes the rising and falling edges of the ON/OFF signal supplied from the gate 20 into a smooth waveform. Moreover, 17 is a differential circuit which outputs a differential waveform of the ON/OFF signal through the capacitor C2 and resistor R13. However, the diode D' shown in the figure is inserted in series in the differential circuit 17 and, therefore, the signal is differentiated only in a single direction of the ON/OFF signal, namely only the falling signal is differentiated and is output to the combining point 15. 12' is a DC amplifier which is different from the amplifier 12 shown in FIG. 12 and has a comparatively high output impedance. Therefore, when amplifier 12' is used, the circuit is influenced by the accummulated charges of switching diode D'. Thereby, only the response of the falling signal of the ON/OFF signal is delayed, providing an adverse influence on transmission of burst signal.

FIG. 18, including 18(a)-18(c), shows the operational waveforms of the switch circuit shown in FIG. 17.

FIG. 18(a) shows the rectangular waveform output from the gate 20. As shown in FIG. 18(b), the rising waveform (h)−1 and falling waveform (h)−2 are shaped by the integral circuit consisting of the resistor R11 and capacitor C5.

In addition, the differential circuit 17 connected in parallel to the integral circuit differentiates only the falling edge (g)−1 of the rectangular wave and outputs the waveform shown in FIG. 18(c).

As explained above, the ON/OFF characteristic in the switch circuit 13 shows deterioration in response at the falling edge due to an influence by accummulated charges of the switching diode D. For this reason, as shown in FIG. 18(d), when the switch 13 is controlled by the signal having only the sharp rising edge, satisfactory switching operation can be realized as shown in FIG. 18(e), where the time constants of the rising waveform (b)−1 and falling waveform (b)−2 are almost equal.

As explained above, according to the present invention, generation of an undesired signal due to transient response can be prevented because reliable switching at the amplitude zero point becomes possible. Moreover, since the switching operation is carried out by the ON/OFF signal which is waveform-shaped, the undesired signal due to the switching operation can be reduced. Therefore, time dividing communication can be realized that does not influence other communication lines.

I claim:

1. A time dividing communication system for transmitting modulation data that has been band limited, comprising:
    modulation means, for modulating the modulation input data after the band limitation, where the modulation data is phase modulated or amplitude modulated and thereafter transmitted as a burst signal in an assigned time slot;
    code adding means, operatively connected to receive the modulation input data and to said modulation means, for adding particular codes to the modulation input data so that the modulated wave becomes a waveform having received a 100% amplitude modulation corresponding to front and rear edges of the modulation input data;
    switching means, operatively connected to said modulation means, for switching the modulated wave at a zero amplitude modulation point and inserting the modulated wave in the assigned time slot; and
    said modulation means comprising a driving modulator and when executing phase modulation or amplitude modulation of said modulation input data, an offset voltage of the driving modulator is changed only during the period corresponding to the front and rear edges of the modulation input data including the particular codes and the switching by said switching means is carried out at the point where amplitude of said modulated wave becomes zero.

2. A time dividing communication system for transmitting modulation data that has been band limited, comprising:
    modulation means, for modulating the modulation input data after the band limitation, where the modulation data is phase modulated or amplitude modulated and thereafter transmitted as a burst signal in an assigned time slot, said modulation means comprising:
    a modulator driving circuit, operatively connected to said code adding means;
    code adding means, operatively connected to receive the modulation input data and to said modulation means, for adding particular codes to the modulation input data so that the modulated wave becomes a waveform having received a 100% amplitude modulation corresponding to front and rear edges of the modulation input data; and
    switching means, operatively connected to said modulation means, for switching the modulated wave at a zero amplitude modulation point and inserting the modulated wave in the assigned time slot, said modulation input data being transmitted as the burst signal and said code adding means adding particular codes to said modulation input data that provide the same data bit condition continuing at least two bits or more at the front edge of said burst signal and the same bit condition continuing at least for two bits or more at the rear edge of said burst signal, and for providing a constant offset voltage at least during the period corresponding to the front and rear edges of the burst signal, and a changed offset voltage at the point where the amplitude of said modulated wave becomes zero.

3. A time dividing communication system for transmitting modulation data that has been band limited, comprising:

modulation means, for modulating the modulation input data after the band limitation, where the modulation data is phase modulated or amplitude modulated and thereafter transmitted as a burst signal in an assigned time slot;

code adding means, operatively connected to receive the modulation input data and to said modulation means, for adding particular codes to the modulation input data so that the modulated wave becomes a waveform having received a 100% amplitude modulation corresponding to front and rear edges of the modulation input data; and switching means, operatively connected to said modulation means, for switching the modulated wave at a zero amplitude modulation point and inserting the modulated wave in the assigned time slot, said modulation input data being transmitted as the burst signal and said code adding means adding particular codes to said modulation input data that provide the same data bit condition continuing at least two bits or more at the front edge of said burst signal and the same bit condition continuing at least for two bits or more at the rear edge of said burst signal, said switching means comprising:

a filter circuit connected to receive and ON/OFF control signal;

an amplifier connected to said filter; and a switching circuit including:
a first capacitor operatively connected to said modulation means;
an inductor operatively connected to said amplifier;
a switching diode operatively connected to said first capacitor, said inductor and ground; and
a second capacitor operatively connected to said first capacitor, said inductor and said switching diode, rising and falling edges of the ON/OFF signal for switching are shaped by said filter circuit during the switching of said modulated wave and thereafter said ON/OFF control signal is input to said amplifier having a low output impedance and the switching is realized by controlling a current of said switching diode using said amplifier output.

4. A time dividing communication system for transmitting modulation data that has been band limited, comprising:

modulation means, for modulating the modulation input data after the band limitation, where the modulation data is phase modulated or amplitude modulated and thereafter transmitted as a burst signal in an assigned time slot;

code adding means, operatively connected to receive the modulation input data and to said modulation means, for adding particular codes to the modulation input data so that the modulated wave becomes a waveform having received a 100% amplitude modulation corresponding to front and rear edges of the modulation input data; and switching means, operatively connected to said modulation means, for switching the modulated wave at a zero amplitude modulation point and inserting the modulated wave in the assigned time slot, said modulation input data being transmitted as the burst signal and said code adding means adding particular codes to said modulation input data that provide the same data bit condition continuing at least two bits or more at the front edge of said burst signal and the same bit condition continuing at least for two bit or more at the rear edge of said burst signal, said switching means comprising:

an integral circuit and a differential circuit operatively connected to receive an ON/OFF control signal;

a first capacitor operatively connected to said modulation means;

an inductor operatively connected to said integral circuit and said differential circuit;

a switching diode operatively connected to said first capacitor, said inductor and ground; and a second capacitor operatively connected to said first capacitor, said inductor and said diode, during the switching of said modulated wave, the ON/OFF control signal for switching is shaped by said integral circuit, it is combined with the signal obtained by differentiating the falling edge of said ON/OFF signal, and a current of said switching diode is controlled by said combined output and thereby the switching is carried out.

5. A time division communication system, comprising:

control signal means for generating control signals;

code signal generation means, operatively connected to said control signal means, for generating front and rear code signals for the data signal in dependence upon the control signals, the front and rear code signals each having zero crossing;

hybrid means, operatively connected to receive the data signal and to the code signal generation means, for producing a combined signal from the data signal and the front and rear code signals;

modulation means, operatively connected to said hybrid means and said control signal means, for modulating the combined signal with a carrier, said modulation means comprising:
driver means, operatively connected to said hybrid means and said control signal means, for outputting an amplified signal in dependence upon the combined signal and the control signals; and
a modulator, operatively connected to said drive means and said switch means, for modulating the amplified signal with the carrier; and switch means, operatively connected to said modulation means and said control signal means, for switching therethrough the modulated combined signal in synchronism with the zero crossing of the front and rear code signals in the modulated combined signal, said driver means including offset means for adjusting the zero crossing coincident with the switching by said switch means.

6. A time division communication system according to claim 5, wherein said driver means comprises:

a gate circuit operatively connected to said hybrid means;

an offset circuit operatively connected to said control signal means; and an amplifier operatively connected to said gate circuit, said offset circuit and said modulator.

7. A time division communication system according to claim 5, wherein said driver means comprises:
a gate circuit operatively connected to said hybrid means;
a switch circuit operatively connected to said gate circuit and said control signal means;
an offset circuit operatively connected to said control signal means; and
an amplifier operatively connected to said switch circuit, said offset circuit and said modulator.

8. A time division communications system according to claim 5, wherein said driver means comprises:
a shift register operatively connected to said hybrid means and said control signal means;
resistors operatively connected to said shift register;
an offset circuit operatively connected to said control signal means; and
an amplifier operatively connected to said offset circuit, said resistors, and said modulator.

9. A time division communication system according to claim 5, wherein said modulation means further comprises a filter operatively connected between said driver means and said modulator.

10. A time division communication system according to claims 5, 6, 7 or 8, wherein said modulator comprises a balance mixer operatively connected to said driver means and said switch means.

11. A time division communication system according to claim 5, wherein said switch means comprises:
a first capacitor operatively connected to said modulator means;
an inductor operatively connected to said control signal means;
a diode operatively connected to said first capacitor, said inductor and ground; and
a second capacitor operatively connected to said first capacitor, said inductor and said diode.

12. A time division communication system according to claim 5,
wherein said system is a four phase modulation system, said data signal comprises first and second data signals, said hybrid means comprises first and second hybrid means, each operatively connected to said control signal means and each for producing a combined signal from the respective data signals and the front and rear code signals, and said modulation means comprises first and second modulation means each connected to the respective first and second hybrid means and to said control circuit means, each for modulating the respective combined signal with a carrier,
wherein said system further comprises data signal hybrid means, operatively connected to said first and second modulation means and said switch means, for combining the modulated signals produced by said first and second modulation means, and
wherein said each of said first and second modulation means comprises:
driver means, operatively connected to the respective said hybrid means and said control signal means, for outputting an amplified signal in dependence upon the respective combined signal and the control signals; and a modulator, operatively connected to said driver means and said data signal hybrid means, for modulating the amplified signal with the carrier.

13. A time division communication system according to claim 12, wherein said driver means comprises:
a gate circuit operatively connected to the respective said hybrid means;
an offset circuit operatively connected to said control signal means; and
an amplifier connected to said gate circuit, said offset circuit and said modulator.

14. A time division communication system according to claim 12, wherein said driver means comprises:
a gate circuit operatively connected to the respective said hybrid means;
a switch circuit operatively connected to said gate circuit and said control signal means;
an offset circuit operatively connected to said control signal means; and
an amplifier operatively connected to said switch circuit, said offset circuit and said modulator.

15. A time division communication system according to claim 12, wherein said driver means comprises:
a shift register operatively connected to the respective said hybrid means and said control signal means;
resistors operatively connected to said shift register;
an offset circuit operatively connected to said control signal means; and
an amplifier operatively connected to said offset circuit, said resistors, and said modulator.

16. A time division communication system according to claim 12, wherein each said modulation means further comprises a filter operatively connected between said driver means and said modulator.

17. A time division communication system according to claim 12, wherein said control signal means comprises:
a gate circuit;
a filter operatively connected to said gate circuit; and
an amplifier operatively connected to said filter and said switch means.

18. A time division communication system according to claim 12, wherein said control signal means comprises:
a gate circuit;
a differential circuit operatively connected to said gate circuit;
an integral circuit operatively connected to said gate circuit; and
an amplifier operatively connected to said differential circuit, said integral circuit and said switch means.

19. A time division communications system according to claim 12, wherein said switch means comprises:
a first capacitor operatively connected to said data signal hybrid means;
an inductor operatively connected to said control signal means;
a diode operatively connected to said first capacitor, said inductor and ground;
a second capacitor operatively connected to said first capacitor, said inductor and said diode.

20. A time dividing communication system according to claims 1 or 2, wherein said switching means comprises:
a filter circuit connected to receive an ON/OFF control signal;
an amplifier connected to said filter; and a switching circuit including:
  a first capacitor operatively connected to said modulation means;
  an inductor operatively connected to said amplifier;
  a switching diode operatively connected to said first capacitor, said inductor and ground; and
  a second capacitor operatively connected to said first capacitor, said inductor and said switching diode rising and falling edges of the ON/OFF signal for switching are shaped by said filter circuit during the switching of said modulated wave and thereafter said ON/OFF control signal is input to said amplifier having a low output impedance and the switching is realized by controlling a current of said switching diode using said amplifier output.

21. A time dividing communication system according to claims 3 or 5, wherein said switching means comprises:
  an integral circuit and a differential circuit operatively connected to receive an ON/OFF control signal;
  a first capacitor operatively connected to said modulation means;
  an inductor operatively connected to said integral circuit and said differential circuit;
  a switching diode operatively connected to said first capacitor, said inductor and ground; and
  a second capacitor operatively connected to said first capacitor, said inductor and said diode, during switching of said modulated wave, the ON/OFF control signal for switching is shaped by said integral circuit and combined with the signal obtained by differentiating the falling edge of said ON/OFF signal, and a current of said switching diode is controlled by said combined output and thereby the switching is carried out.

* * * * *

UNITED STATES PATENT AND TRADEMARK OFFICE
CERTIFICATE OF CORRECTION

PATENT NO. : 4,644,531

DATED : February 17, 1987

INVENTOR(S) : Sasaki

It is certified that error appears in the above-identified patent and that said Letters Patent is hereby corrected as shown below:

Column 4, line 47, after "of" (second occurrence) insert -- $\pi$ --.
Column 6, line 31, "transitter" should be --transmitter--.
Column 11, line 36, "and" should be --an--.
Column 12, line 13, "bit" should be --bits--.
Column 13, line 15, "communications" should be --communication--.
Column 14, line 53, "communications" should be --communication--.
Column 16, line 2, "3 or 5," should be --1 or 2,--.

Signed and Sealed this

Second Day of August, 1988

*Attest:*

DONALD J. QUIGG

*Attesting Officer*     *Commissioner of Patents and Trademarks*